(12) United States Patent
Gupta et al.

(10) Patent No.: US 10,209,997 B2
(45) Date of Patent: Feb. 19, 2019

(54) COMPUTER ARCHITECTURE FOR SPECULATIVE PARALLEL EXECUTION

(71) Applicant: Wisconsin Alumni Research Foundation, Madison, WI (US)

(72) Inventors: Gagan Gupta, Madison, WI (US); Gurindar S. Sohi, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 598 days.

(21) Appl. No.: 14/728,162

(22) Filed: Jun. 2, 2015

(65) Prior Publication Data

US 2016/0357608 A1 Dec. 8, 2016

(51) Int. Cl.
*G06F 9/38* (2018.01)
*G06F 9/50* (2006.01)

(52) U.S. Cl.
CPC ............ *G06F 9/3842* (2013.01); *G06F 9/38* (2013.01); *G06F 9/5038* (2013.01)

(58) Field of Classification Search
CPC ......... G06F 9/5038; G06F 9/3842; G06F 9/38
See application file for complete search history.

(56) References Cited

U.S. PATENT DOCUMENTS

| | | | | |
|---|---|---|---|---|
| 6,345,351 | B1 * | 2/2002 | Holmberg | G06F 12/1036 711/203 |
| 6,665,708 | B1 * | 12/2003 | Tikekar | G06F 9/52 709/215 |
| 9,727,370 | B2 * | 8/2017 | Greiner | G06F 12/084 |
| 2004/0158549 | A1 * | 8/2004 | Matena | G06F 11/2097 |
| 2007/0192545 | A1 * | 8/2007 | Gara | G06F 9/3842 711/141 |
| 2008/0256074 | A1 * | 10/2008 | Lev | G06F 9/466 |
| 2010/0070740 | A1 | 3/2010 | Allen et al. | |
| 2011/0209154 | A1 * | 8/2011 | Gooding | G06F 9/467 718/103 |
| 2011/0209155 | A1 * | 8/2011 | Giampapa | G06F 9/467 718/103 |
| 2012/0066690 | A1 | 3/2012 | Gupta et al. | |
| 2012/0180062 | A1 | 7/2012 | Sohi et al. | |
| 2014/0259024 | A1 | 9/2014 | Sridharan et al. | |

\* cited by examiner

*Primary Examiner* — Benjamin C Wu
(74) *Attorney, Agent, or Firm* — Boyle Fredrickson, S.C.

(57) ABSTRACT

A system for parallel execution of program portions on different processors permits speculative execution of the program portions before a determination is made as to whether there is a data dependency between the portion and older but unexecuted portions. Before commitment of the program portions in a sequential execution order, data dependencies are resolved through a token system that tracks read access and write access to data elements accessed by the program portions.

20 Claims, 4 Drawing Sheets

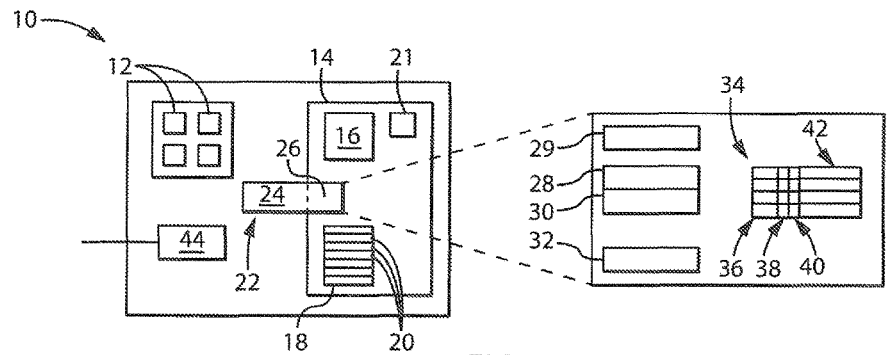
FIG. 1
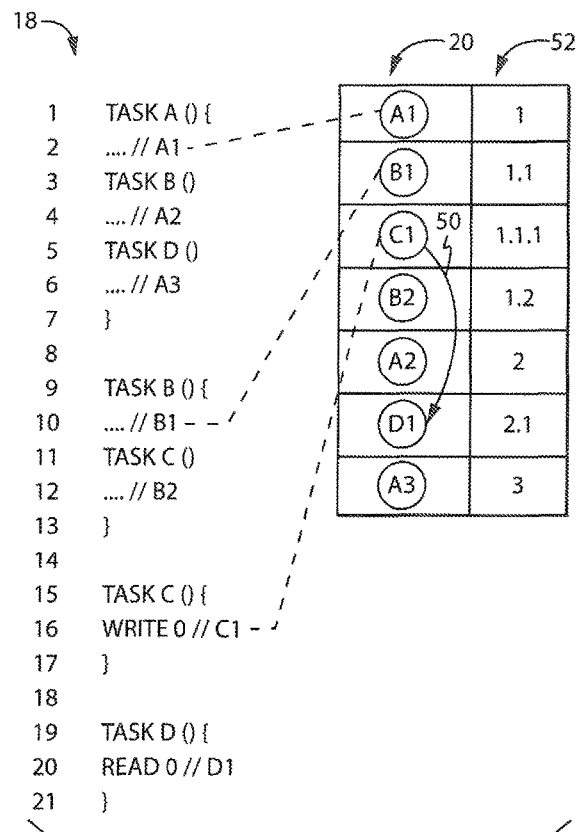
FIG. 2
FIG. 3

COMPUTER ARCHITECTURE FOR SPECULATIVE PARALLEL EXECUTION

STATEMENT REGARDING FEDERALLY SPONSORED RESEARCH OR DEVELOPMENT

This invention was made with government support under 0963737 awarded by the National Science Foundation. The government has certain rights in the invention.

CROSS REFERENCE TO RELATED APPLICATION

Background of the Invention

The present invention relates to computer architectures for executing computer programs in parallel on multiple processors and in particular to an architecture that allows for speculative execution of program tasks before data dependencies for those tasks are resolved.

Substantial improvements in program execution speeds have been realized through more powerful processors that can handle larger data "words" and can execute a higher number of instructions per second.

An alternative way to increase program execution speed divides the program into portions that are executed in parallel on multiple processors. Ideally, as more performance is required, more processors may be added to the system. This approach can be extended to processors having multiple "cores" and further extended with cores that can run more than one program simultaneously (termed "multithreaded cores" such as should be distinguished from the software technique of multi-threading).

Improved execution speed of a program using these techniques depends on the ability to divide a program into portions that may be executed in parallel on the different processors. Parallel execution in this context requires identifying portions of the program that are independent such that they do not simultaneously operate on the same data. Of principal concern are portions of the program that may write to the same data, "write-write" dependency, and portions of the program that may implement a reading of data subsequent to a writing of that data, "read-write" dependency, or a writing of data subsequent to a reading of the data, "write-read" dependency. Errors can result if any of these reads and writes change in order as a result of parallel execution.

Many current programs are written using a sequential programming model expressed as a series of steps operating on data. This model provides a simple, intuitive programming interface because, at each step, the generator of the program (for example, the programmer, compiler, and/or some other form of translator) can assume the previous steps have been completed and the results are available for use. However, the implicit dependence between each step obscures possible independence among instructions needed for parallel execution. To statically parallelize a program written using the sequential programming model, the program generator must analyze all possible inputs to different portions of the program to establish their independence. Such automatic static parallelization works for programs which operate on regularly structured data but has proven difficult for general programs. In addition, such static analysis cannot identify opportunities for parallelization that can be determined only at the time of execution when the data being read from or written to can be positively identified.

U.S. patent application Ser. No. 12/543,354 filed Aug. 18, 2009 (the "Serialization" patent), assigned to the same assignee as the present invention and hereby incorporated by reference, describes a system for parallelizing programs written using a sequential program model during an execution of that program. In this invention, "serializers" are associated with groups of instructions ("computational operations") to be executed before execution of their associated computational operations. The serializers may thus positively identify the data accessed by the computational operation to assign the computational operation to a particular processing queue. Computational operations operating on the same data are assigned to the same queue to preserve their serial execution order. Computational operations operating on disjoint data may be assigned to different queues for parallel execution. By performing the parallelization during execution of the program, many additional opportunities for parallelization may be exploited beyond those which may be identified statically.

This serialization method may also be used where the datasets of computational operations are not completely disjoint through the use of a "call" instruction which collapses parallel execution when a data dependency may exist, causing the program to revert to conventional serial execution. This approach slows executions of concurrent parallel instruction groups and limits the discovery of potential parallelism downstream from the "call" instruction while the "call" is in force.

A more flexible accommodation of datasets that are not completely disjoint is taught in US patent application 2012/0066690 also assigned the same assignee as the present invention and incorporated by reference. In this approach, overlapping datasets are linked to tokens (in one embodiment: read and write tokens) whose availability indicates that there are no unresolved data dependencies. When data dependencies exist, tasks may be placed in a waiting queue to obtain the tokens.

SUMMARY OF THE INVENTION

The present invention recognizes that a token technique may be used to allow speculative execution of program portions even when data dependencies have not yet been resolved. In one embodiment, a reorder list is used to ensure completion of the program portions in sequential execution order and the token system used to squash program portions that were prematurely executed as indicated by later discovered data dependencies. By eliminating the need to wait until late in program execution to detect or resolve dependencies, improved processor utilization may be had. Advancing the execution of program portions that ultimately do not experience data dependency problems can have a ripple-through affect reducing later data dependencies as well.

Specifically, the present invention provides a multiprocessor computer architecture having at least two computer processors and a memory for holding a non transient stored program comprised of separately executable tasks and a dataset operated on by the tasks. A runtime system operates to: (a) identify a sequential execution order of the tasks based on the sequential execution order of the program; (b) allocate tasks to different processors out of sequential execution order for execution on the different processors; (c) checkpointing modification by the tasks of accessed elements of the dataset to preserve an unmodified version of the accessed data element; (d) commit execution of the tasks according to the sequential execution order; (e) squash earlier allocated tasks before a given task is committed in the sequential execution order if the earlier allocated tasks are data dependent on the given task, the squashing ceasing execution of the earlier allocated tasks and restoring elements of the dataset accessed by the earlier tasks to the unmodified versions per the checkpointing.

It is thus a feature of at least one embodiment of the invention to provide a system that may speculatively execute program tasks before determination of whether there is a data dependency thus improving processor utilization.

The multiprocessor computer architecture may further include a reorder list receiving an identification of each allocated task at the time of allocation and holding the identification in the sequential execution order before commitment and wherein step (d) commits the oldest task in the reorder list.

It is thus a feature of at least one embodiment of the invention to ensure commitment of the tasks in sequential execution order regardless of their execution order thereby allowing out of order execution while maintaining the correctness ensured by sequential execution.

The commitment may remove the identification of the committed task from the reorder list.

It is thus a feature of at least one embodiment of the invention to provide a compact ordering structure that can be practically implemented in software or hardware.

The data dependency may be detected by monitoring access to elements of the dataset by each task and detecting whether a younger task has accessed a given data element before allocation of an older task accessing the given data element to a processor, where one of the accesses is a write access.

It is thus a feature of at least one embodiment of the invention to provide a way to detect actual runtime data dependency that can accommodate changes in data dependency during runtime and that can ignore potential data dependency which fails to materialize.

The data elements may be associated with read and write tokens that must be acquired by a task to access a data element and wherein multiple read tokens may be granted to tasks for a given data element only if no write token has been granted, and where a write token may be granted to a task only if a read token has not been granted to any task and wherein data dependency is detected when a younger task obtains the token before an older task and at least one of the younger and older tasks acquired the write token. It is thus a feature of at least one embodiment of the invention to provide a simple mechanism that is readily implemented in computer architectures for detecting data dependency problems.

The multiprocessor computer architecture may further include a requester list storing tasks that request tokens and indicating a sequential execution order of the tasks and wherein the requester list is used to identify for squashing a younger task that obtains a token before an older task. It is thus a feature of at least one embodiment of the invention to provide a flexible method of identifying a task that must be squashed when a data dependency error is detected.

The squashing may reallocate the squashed task after the squashing.

It is thus a feature of at least one embodiment of the invention to ensure completion of each of the parallel tasks despite squashing.

The commitment may erase data stored for the committed task in the checkpointing of step (c).

The commitment may erase the request for the committed task from the requester list.

It is thus a feature of at least one embodiment of the invention to permit a compact checkpoint storage mechanism that may be implemented in hardware.

The different processors are different cores or different execution contexts of a single core.

It is thus a feature of at least one embodiment of the invention to provide a method that flexibly accommodates different mechanisms for parallel execution.

The runtime system includes hardware and software and the hardware may include hardware unique to the runtime system.

It is thus a feature of at least one embodiment of the invention to provide an architecture that can be implemented in specialize circuitry for high-speed execution.

The data elements may be data objects.

It is thus a feature of at least one embodiment of the invention to provide a simple method of coarse-grain identification of common memory elements. Identifying data objects permits considering multiple variable addresses together for the purpose of dependency tracking reducing the amount of storage required.

These particular objects and advantages may apply to only some embodiments falling within the claims and thus do not define the scope of the invention.

BRIEF DESCRIPTION OF THE DRAWINGS

FIG. 1 is a simplified block diagram of a multiprocessor system that may incorporate the present invention showing a runtime system that may be implemented in hardware and software including a reorder list, a history buffer, a sequential execution order store (which may be integrated into the reorder list), read and write tokens, and a requester list;

FIG. 2 is an example program having multiple tasks in a sequential execution order, two of the tasks exhibiting a data dependency and showing an assignment of an expandable, fractional sequence number to each of the tasks;

FIG. 3 is a diagram of the tasks arranged by nesting level and task number;

DETAILED DESCRIPTION OF THE PREFERRED EMBODIMENT

Figure 4:
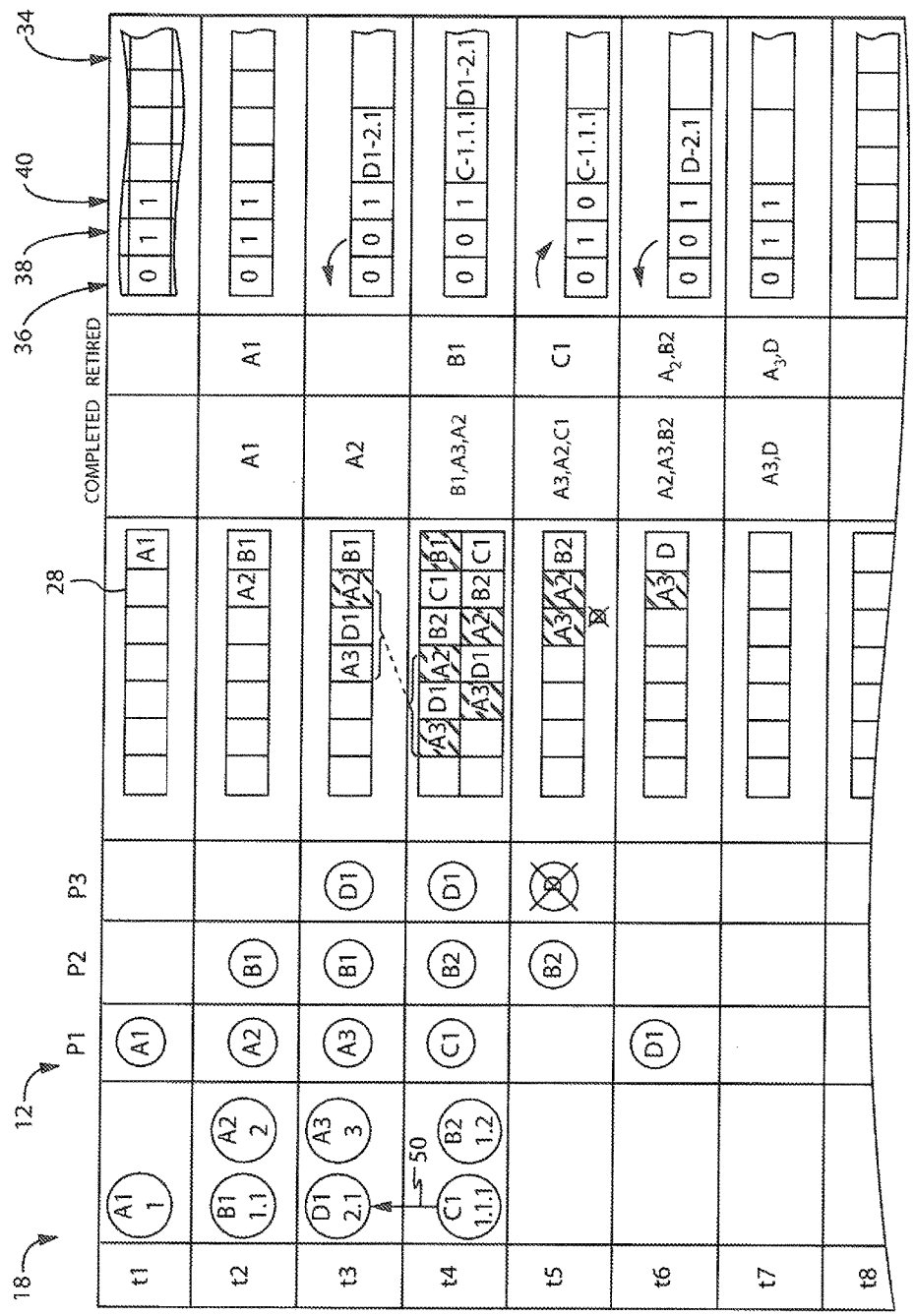
FIG. 4 is a chart showing the execution of the tasks of FIG. 2 according to the present invention and illustrating the assignment of tasks to different processors and the use of the reorder list, read and write tokens and a requester list.

Referring now to FIG. 1, a multi-processor system 10 may include multiple processors 12 each allowing independent execution of programs. The multiple processors 12 may be full microprocessors, processor cores, or execution contexts of an individual processor or core that allow maintenance of multiple execution states for simultaneous or time-shared execution of programs.

The processors 12 may communicate with a shared memory 14 intended to represent both local memory structures such as caches, buffers and the like as well as structures such as random access memory and disk drives. Importantly, each of the processors 12 may read and write data in common with the other processors 12.

The memory 14 may generally include an operating system 16 as well as one or more application programs 18. Each of the application programs 18 may be made up of separate tasks 20 that may be susceptible to parallel execution. The memory 14 may also hold a dataset 21 accessed by application programs 18.

A runtime system 22 to implement the present invention may include both dedicated hardware 24 and software features 26 as will be generally understood in the art from the following description. The runtime system 22 provides for a number of data structures including: a reorder list 28; a history buffer 30; a sequential execution order store 32 identifying a sequential execution order of tasks 20 of a program 18; a data element access table 34 providing identifiers 36 for identifying data elements accessed by the tasks 20 and, for each identified data element, read tokens 38 for controlling the reading of data elements and write tokens 40 for controlling the writing to data elements; and a request list 42 recording an identity of tasks 20 requesting tokens. The runtime system 22 also provides for a firmware or software operating program 29 as will be discussed below. Portions of this operating program 29 may be incorporated into the operating system 16. As a practical matter, the sequential execution order store 32 may be incorporated into the reorder list 28 providing storage of the sequential order number 52 of tasks in the reorder list 28 as will be discussed below.

Each of the processors 12 may also communicate via I/O circuitry 44 with external devices, for example, a programming terminal, networks and the like for receiving programs 18 and instructions from a user.

The program 18 will be comprised of multiple computer executable instructions (for example, instructions of the C++ programming language) collected into tasks 20. A task 20, for example, may be a function, a subroutine, an object method, or other natural logical division of the application program 18 and may be comprised of different methods or multiple invocations of the same method. The program 18 may be generated using a sequential programming model, meaning that all or part of the program was generated as if it would be executed on a single processor or as a single thread.

The sequential execution order will allow the determination of an order of any two tasks 20 even if the exact number of tasks 20 changes dynamically during runtime. Thus, for example, a loop may invoke a task for a number of times determined by a variable available only at run time. Nevertheless, each loop iteration, comprising a different task 20, can be placed in a definitive order within the looping and with respect to other tasks using the sequential execution order which considers how the program would execute on a single processor and single thread. Likewise a task that is executed conditionally (and thus may not execute at all) may still be given a definitive ordering with respect to other tasks 20.

Generally, each task 20 will access the dataset 21 held in the shared memory 14 by reading or writing data elements to or from the dataset 21. Each task 20 may identify a write set and a read set indicating at execution using unique identifiers of the data written to and read by the tasks 20 (hence its argument(s) and value(s)), for example, by variable addresses or instanced object identifiers. It will be understood that the underlying data of the write set and read set may not be resolved or known at the time of program generation but determined only when the program is running. For this reason, the actual addresses of the read set and write set will frequently not be known by the program generator.

When given task 20 of the application program 18 is executed multiple times in different instances (for example, either as part of different instantiated objects or repeated calls to a given function), each different instance may have a different read set and write set dynamically determined during the execution of the application program 18.

During parallel execution, the tasks 20 may be executed in a parallel execution order that changes dynamically during run time and that differs from the sequential execution order.

Referring now to FIG. 2, an example program 18 may comprise tasks 20 labeled A, B, C and D, each comprised of smaller tasks 20 having instructions (or groups of instructions) designated by line numbers. For example, a first task 20 (task A: lines 1-7 may execute some instructions comprising a smaller task A1 and then make a call to a second task 20 (task B) followed by the execution of additional instructions (task A2) followed by a call to a third task 20 (task D) followed by the execution of additional instructions (task A3). Task B (lines 9-13) when called, may in turn execute some additional instructions (task B1) and then may call a fourth task 20 (task C) followed by the execution of some additional instructions (task B2). Each of task C (lines 15-17) and task D (lines 19-21) may execute smaller tasks C1 and D1 respectively. Importantly task C1 performs a write to a data element designated O and task D1 performs a read of the same data element O thus establishing a data dependency 50 of task D1 on task C1 that is violated if task D1 is executed before task C1.

A task that calls other tasks is called a parent task. All tasks transitively called from a parent task are said to be the descendants of the parent task. In the above example, task C is descendent of task B, and tasks B, C, and D are descendants of task A.

Each of these tasks 20 may be given a unique sequential execution order number 52 establishing a definitive order according to the sequential execution order of the program 18. In this example, that sequential execution order will be A1, B1, C1, B2, A2, D1, A3 as may be established progressively as the program executes The sequential execution order number 52 is desirably expressed as a decimal fraction to capture this order while allowing expansions within the order, for example, caused by multiple executions of a given task 20 during actual program execution (for example, in a loop) without the need to renumber the other tasks 20.

Referring momentarily to FIG. 3, the sequential execution order numbers 52 for any given task 20 may reflect the sequential execution order number 52 of its parent(s) adding an additional decimal for each nested level that the task 20 is removed from its parent. The final digit of the decimal fraction will indicate the order of the task 20 at a given nesting level. Thus, for example, task A1 has a decimal fraction of 1 and tasks B1 and B2 that have A1 as a parent have respective decimal numbers of 1.1 and 1.2 indicating their parent task (A1) and their order within that particular nested level. Likewise, a decimal number of 1.1.1 for C1 indicates that its parent task has the number 1.1 (B1). It will be appreciated that if task B2 were to loop, multiple additional tasks 1.3, 1.4, etc. could be generated without upsetting the numbering of all of the other tasks as established by sequential execution order. Thus the sequential execution order number 52 may be expanded at run time but in accordance with the sequential execution order.

Figure 5:
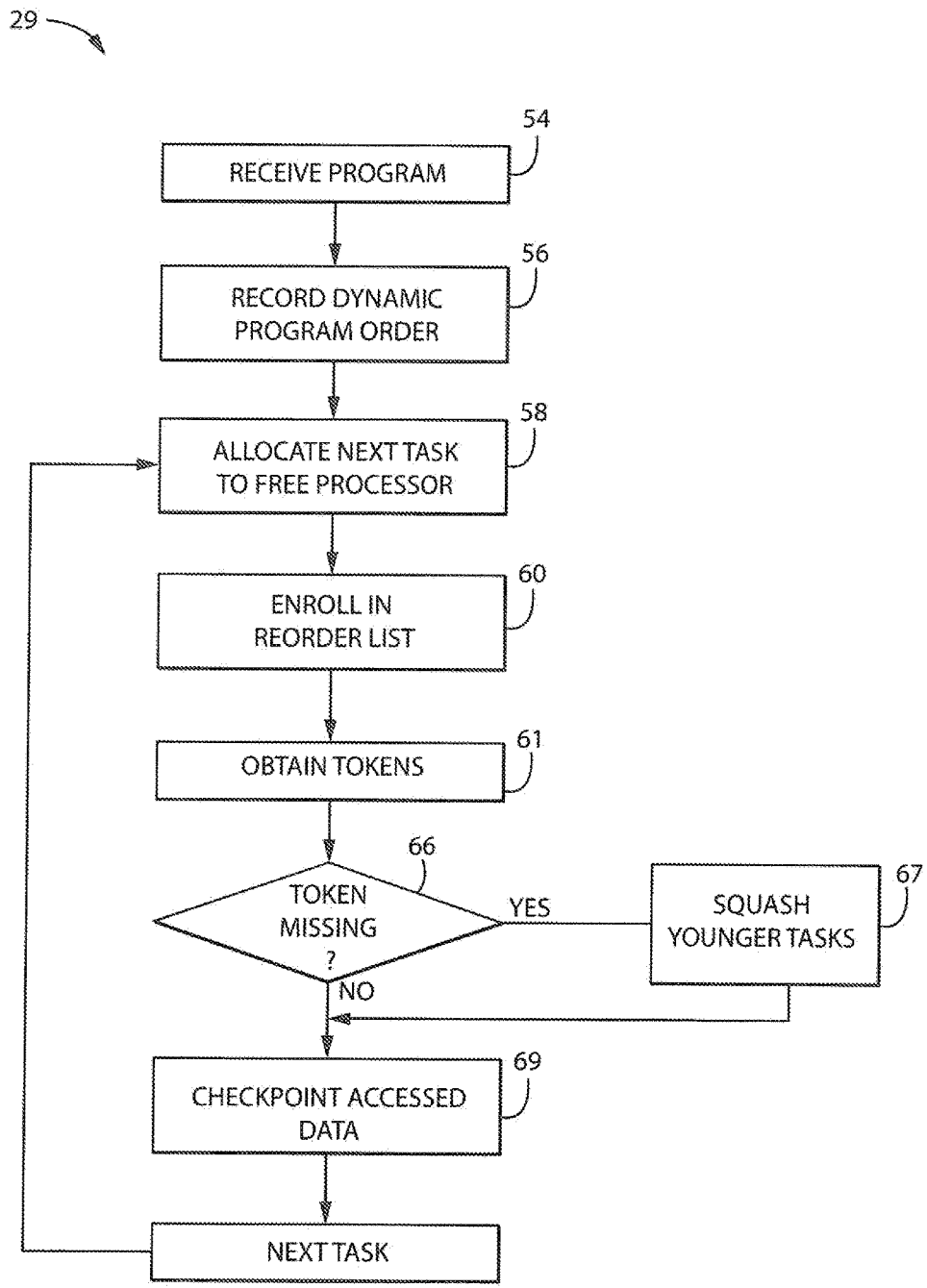
FIG. 5 is a flowchart of the process implemented in FIG. 4 in allocating program portions to processors.

Referring now to FIGS. 4 and 5, the operating program 29 of FIG. 1 may be executed in the present invention as indicated by process block 54 beginning with receipt of the program 18. At process block 56, the sequential execution order may be determined for each task 20, for example, per the numbering system of FIG. 2 assigning a sequential execution order number 52 to each task 20. The mapping between sequential execution order number 52 and tasks 20 determined as tasks 20 are enrolled in the reorder list 28 and held in a sequential order store 32 as part of the data held in the reorder list 28 for each task for reference during execution of the program 18.

At process block 58, the tasks 20 of the program 18 are assigned to available processors 12 which for simplicity are assumed to be three in number: P1-P3. In this example, task A1 will be assigned a processor P1 at epoch t1 (the term epoch indicating only a relative time order rather than a particular length of time). Upon this allocation, as indicated by process block 60, an identifier for the task A1, for example, its unique sequential execution order number 52, may be enrolled in the reorder list 28 following the sequential execution order where the "oldest" task 20 is at the rightmost position as depicted.

These following process blocks apply only to cases where the task 20 accesses the dataset 21. Here it is assumed that no such access occurs for task A1 and accordingly the program loops back to process block 58.

Figure 6:
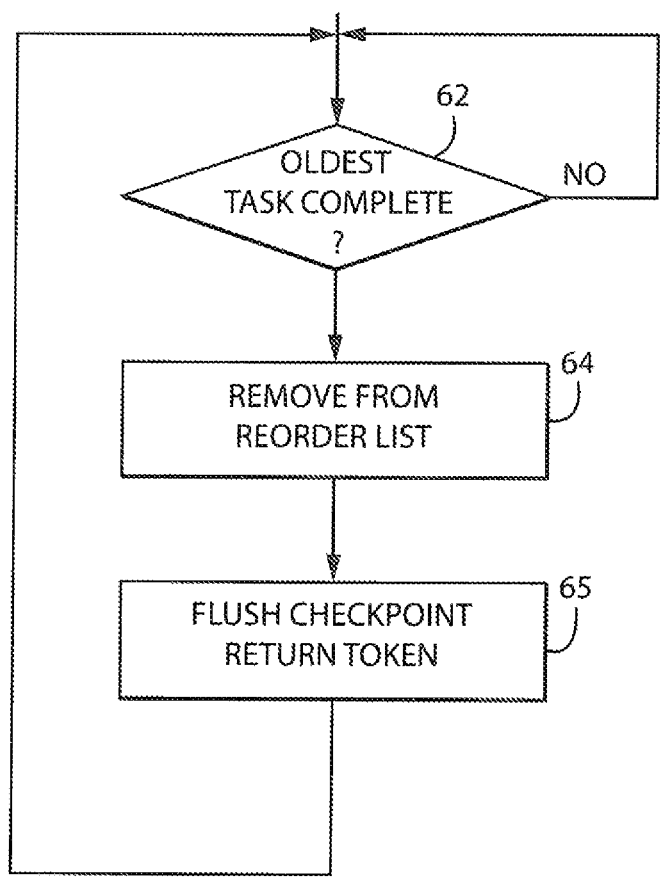
FIG. 6 is a flowchart of the process of committing completed program portions.

At epoch t2, and referring also to FIG. 6, it is assumed for this example that task A1 completes. Because task A1 is the oldest task in the reorder list 28, as determined by decision block 62, it is removed from the reorder list 28 (retired) as indicated by process block 64. As will be discussed in more detail below, there was no memory access by this task A1, so the remaining process blocks of FIG. 6 may be skipped and the program loops back to decision block 62. If A1 had accessed memory and had been enrolled in the request list 42, that entry in the request list 42 would be removed at process block 64 as will be discussed below.

Referring again back to FIG. 5, also at epoch t2, new tasks A2 and B1 are assigned to processors P1 and P2. Note that this assignment is not necessarily according to the sequential execution order (which would assign B1 and C1 next) but may be independent of sequential execution order. The tasks A2 and B1 are nevertheless given an ordering in the reorder list 28 that is consistent with the ordering of the sequential execution order with respect to all other tasks in the reorder list 28. That is task B1, older than younger task A2 is placed to the right of task A2 per the above described convention. Neither of these tasks access memory (by assumption for this example) and accordingly the program loops back to process block 58.

At epoch t3, is assumed that task A2 completes. At decision block 62, this task A2 is not the oldest task in the sequential execution order (which would be B1) and accordingly task A2 remains in the reorder list 28 (shaded to show it is complete).

Also at this epoch t3, tasks D1 and A3 are allocated to processors (P2 and P1) to begin execution. In this example, task D1 accesses memory by reading the memory object O (as indicated in FIG. 2) and accordingly after being entered into the reorder list 28 task D1 must obtain a read token 38 from the data element access table 34 as indicated by process block 61. The access target of O is used to identify a row of the data element access table 34 per identifier 36 or, if there is no pre-existing row, to create a new row. The present invention contemplates that the identifier 36 may be of any form so long as it definitively identifies accessed memory, including a memory address, a memory address range, and a data object identifier, or the like.

Because task D1 requires a reading of data object O, in one embodiment the read token 38 is given to task D indicated by a incrementing of a value recording a number of issued read tokens 38, for example, in this case incrementing the value from one to a value of two. In other embodiments, other ways of maintaining and managing the read tokens could be implemented.

The runtime system 22 enforces a set of rules for obtaining the read tokens 38 and write tokens 40 as follows. A task 20 that wishes to read or write to a data object must have a token. Only as long as the single write token 40 has not been granted (indicated by a one value for the write token 40 in the data element access table 34 in this example), multiple read tokens 38 can be simultaneously granted. Each granting of a read token 38 causes a incrementing of the read token 38 value. Only as long as no read tokens have been granted (indicated by a one value in the read token 38 in the data element access table 34 in this example), the write token may be granted. Write token is granted by decrementing of the write token 40 value from 1 to 0. Other embodiments could be implemented to manage the read and write tokens.

In this case, because the write token 40 is present in the data element access table 34, the task D1 may obtain a read permission indicated by the read token 38. This read access is provided despite the lack of any knowledge at this point as to whether there is a data dependency in task D1 (and in fact there is such a data dependency) and accordingly this execution of task D1 is being performed speculatively.

At the time the read token 38 is acquired, also at process block 61, task D1 also enrolls its identifier and sequential execution order number 52 (e.g., D1-2.1) in the request list 42 indexed by the data object O. The data object O being accessed by task D1 is next checkpointed in history buffer 30 indexed to task D1, at process block 69, meaning a copy is made of this data object O for modification so that any modification of this data object by task D1 can be undone if task D1 is later squashed.

Referring still to FIGS. 4, 5 and 6, at epoch t4, tasks B1 and A3 complete. New tasks C1 and B82 are allocated to processors 12 and identifiers for these tasks 20 are added to the reorder list 28, not at the end but according to the sequential execution order so that they follow task B1 and move task A2 and other pre-existing tasks to the left. This movement is provided by determining the sequential execution number 52 of tasks C1 and B2 and comparing those numbers to the sequential execution number associated with the tasks currently in the reorder list 28 being part of the sequential order store 32 so that all tasks in the reorder list are in the order of their sequential execution numbers 52. Per decision block 62, task B1 is retired as being a completed task that is the oldest task in the reorder lists 28.

Significantly, task C1 requires a writing to data object O and accordingly is directed to the data element access table 34 and the row entry for data object O in order to obtain the write token 40, The write token 40 may not be released under the rules enforced by the runtime system 22, however, because a read token 38 is missing, having been taken by task D1 previously, as detected at decision block 66.

The runtime system 22, detecting this conflict of task C1 and being unable to obtain a write token 40, then reads the request list 42 (which now also holds the request by task C1) and determines that the missing read token 38 has been taken by a younger task D1. The relative age of these tasks is simply determined by comparing the sequential execution order number 52 of task D1 of 2.1 to the sequential execution order number 52 of task C1 of 1.1. In this comparison process, the left decimal places are dispositive and right decimal places are only considered if the immediately left decimal places are equal. Generally, this process may identify one or more younger tasks depending on how many read tokens 38 are missing. Such tasks, D1 in this case, are said to be misspeculated.

This younger task(s), in this case only task D1, is then squashed as indicated by process block 67 which removes the task D1 from execution on its current processor 12 and restores the variable(s) modified by the task D1 (in this case data element O) to its earlier state using the checkpoint value of the history buffer 30. In some embodiments, all tasks that are data dependent or control dependent on task D1 (descendant tasks) will also be squashed along with task D1 as determined by the sequential order numbers 52. Alternatively, in another embodiment, speculation may be blocked for any tasks that would be data dependent or control dependent on a currently speculated task that is not yet committed.

In the current example, the read token 38 taken by task D1 is returned and the information about squashed task D1 removed from the request list 42. After restoration of data element O caused by the squashing, that checkpoint value is removed from the history buffer 30 as no longer needed.

Task C1 then obtains the write token 40 it requires at decision block 66 and checkpoints the data it will be accessing at process block 69.

It is also possible that misspeculated computations have completed when the misspeculation is detected. For example, above when task C1 tries to acquire the token for O in epoch t4, the younger task D1 which had acquired token for O may have already completed and returned it's token. Although now the token for O will be available for C1 to acquire, the runtime will detect the misspeculation because D1's token request will still be in the request list 42. In this case, D1 which is completed but not retired is squashed, as are tasks dependent on D1 and the descendants of D1, meaning that checkpoints of D1, any dependent computations, and descendant computations are used to restore the state they may have modified. C1 is submitted for execution and once it completes, D1 and its dependent computations are restarted.

Squashing of a task causes the task and its descendant tasks, if any, to be removed from the reorder list.

As shown at epoch t5, task C1 may then complete. Because task C1 is now the oldest task in the reorder list 28, at decision block 62, it is removed from the reorder list 28 and its write token 40 is returned and its checkpoint data is released per process block 65. Because C1 is retired, its information is removed from the request list 42. Because C1 is complete, the dependent task D1 may now be re-allocated.

As shown at epoch to, task B2 may next complete allowing both it and previously completed task A2 to be retired in sequential execution order. Task D is then re-allocated to a processor 12 and takes its place ahead of task A3 (which is already completed) per the sequential execution order. Again task D1 takes the read token 38 and enrolls itself in the request list 42.

At epoch t7 task D1 may complete and tasks D1 and A3 can be retired in task order. At this time task D1 returns the read token 38 for data element O.

It will be appreciated that in cases where there is no data dependence, the execution tasks 20 may be much accelerated by the speculation allowed in the present invention allowing the processors 12 to be fully utilized and later tasks, dependent on the executing tasks, advanced in execution.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The term "architecture" is intended to broadly include all features of the computer whether they are implemented in hardware, firmware, software or a combination of these.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a "processor" should include the concepts of separate processors, core, and processing contexts, for example, in a multithreaded core. The term "task" may each be understood to be portions of one or more interacting programs as context requires.

References to memory, unless otherwise specified, can include one or more processor-readable and accessible memory elements and/or components that can be internal to the processor-controlled device, external to the processor-controlled device, and can be accessed via a wired or wireless network.

The description of structures and operations herein should be understood to indicate logical structures and operations and therefore to include structures and operations that produce the same logical result. For example, removal of data from the reorder list should be understood to mean logical removal which may, for example, keep the data in the reorder list but market that data as using a flag or the like. Similarly, lists or tables need only provide that logical organization and do not require contiguous data locations or row and column alignment and physical memory.

It is specifically intended that the present invention not be limited to the embodiments and illustrations contained herein and the claims should be understood to include modified forms of those embodiments including portions of the embodiments and combinations of elements of different embodiments as conic within the scope of the following claims. All of the publications described herein, including patents and non-patent publications, are hereby incorporated herein by reference in their entireties.

What we claim is:

1. A multiprocessor computer architecture comprising:
    at least two computer processors;
    a memory for holding a non-transient stored program comprised of separately executable tasks and a dataset operated on by the tasks; and
    a runtime system operating to:
    (a) identify a sequential execution order of the tasks based on a serial execution of the program;

(b) allocate tasks to different processors out of sequential execution order for execution on the different processors;
(c) checkpointing modification by the tasks of accessed elements of the dataset, such modification generating a changed value of the accessed elements of the dataset, to preserve an unmodified version of the accessed elements unaffected by the generated changed value of the accessed elements;
(d) commit execution of the tasks according to the sequential execution order;
(e) before a given task is committed, squash earlier allocated tasks that are before the given task in the sequential execution order, if the earlier allocated tasks are data dependent on the given task, in which one of the earlier allocated tasks and the given task modify shared data accessed by both the earlier allocated tasks and the given task, the squashing nullifying results of any execution of the earlier allocated task and restoring any elements of the dataset accessed by the earlier tasks to the unmodified versions per the checkpointing; and
(f) allow reexecution of the squashed, earlier allocated tasks only after determination of whether the given task has completed accessing the shared data.

2. The multiprocessor computer architecture of claim 1 wherein the sequential execution order is the order that the program would execute on a single processor as a single thread.

3. The multiprocessor computer architecture of claim 1 further including a reorder list receiving an identification of each allocated task at the time of allocation and holding the identification in the sequential execution order before commitment and wherein step (d) commits an oldest task in the reorder list.

4. The multiprocessor computer architecture of claim 3 wherein commitment removes the identification of committed tasks from the reorder list.

5. The multiprocessor computer architecture of claim 1 wherein data dependency is detected by monitoring access to elements of the dataset by each task and detecting whether a younger task has accessed a given data element before allocation of an older task accessing the given data element to a processor, where one of the accesses is a write access.

6. A multiprocessor computer architecture comprising:
at least two computer processors;
a memory for holding a non-transient stored program comprised of separately executable tasks and a dataset operated on by the tasks; and
a runtime system operating to:
(a) identify a sequential execution order of the tasks based on a serial execution of the program;
(b) allocate tasks to different processors out of sequential execution order for execution on the different processors;
(c) checkpointing modification by the tasks of accessed elements of the dataset, such modification changing values of the accessed elements of the dataset, to preserve an unmodified version of the accessed elements allowing the accessed elements of the dataset to be restored to a value before the modification unaffected by the generated changed value of the accessed elements;
(d) commit execution of the tasks according to the sequential execution order;
(e) squash earlier allocated tasks that are before a given task is committed in the sequential execution order if the earlier allocated tasks are data dependent on the given task, in which one of the earlier allocated tasks and the given task modify data accessed by both the earlier allocated tasks and the given task, the squashing nullifying results of any execution of the earlier allocated task and ensuring any elements of the dataset accessed by the earlier tasks conform to the unmodified versions per the checkpointing; and
(f) allow reexecution of the squashed, earlier allocated tasks only upon completion of execution of the given task;
wherein data dependency is detected by monitoring access to elements of the dataset by each task and detecting whether a younger task has accessed a given data element before allocation of an older task accessing the given data element to a processor, where one of the accesses is a write access;
wherein the data elements are associated with read and write tokens that must be acquired by a task to access a data element, and wherein multiple read tokens may be granted to tasks for a given data element only if no write token has been granted, and wherein a write token may be granted to a task only if a read token has not been granted to any task, and wherein data dependency is detected when a younger task is found to have obtained a token necessary to access a data element before an older task and one of the younger and older tasks acquired a write token.

7. The multiprocessor computer architecture of claim 6 further including a requester list storing tasks that request tokens and indicating a sequential execution order of the tasks, and wherein the requester list is used to identify for squashing a younger task that prevents an older task from obtaining a token.

8. The multiprocessor computer architecture of claim 1 wherein the squashing of (e) reallocates a squashed task after the squashing.

9. The multiprocessor computer architecture of claim 1 wherein the committing erases data stored for a committed task in the checkpointing of step (c).

10. The multiprocessor computer architecture of claim 1 wherein the different processors are different cores.

11. The multiprocessor computer architecture of claim 1 wherein the different processors are different execution contexts of a single core.

12. The multiprocessor computer architecture of claim 1 wherein the runtime system includes hardware and software.

13. The multiprocessor computer architecture of claim 12 wherein the hardware includes hardware unique to the runtime system.

14. The multiprocessor computer architecture of claim 1 wherein the data elements are data objects.

15. A method of executing programs on a multiprocessor computer having at least two computer processors and a memory for holding a non-transient stored program comprised of separately executable tasks and a dataset operated on by the tasks;
the method comprising:
(a) identifying a sequential execution order of the tasks based on a serial execution of the program;
(b) allocating tasks to different processors out of sequential execution order for execution on the different processors;
(c) checkpointing modification by the tasks of accessed elements of the dataset, such modification generating a changed value of the accessed elements of the dataset, to preserve an unmodified version of the accessed elements unaffected by the generated changed value of the accessed elements;

(d) committing execution of the tasks according to the sequential execution order; and (e) before a given task is committed, squashing earlier allocated tasks that are before the given task in the sequential execution order, if the earlier allocated tasks are data dependent on the given task, in which one of the earlier allocated tasks and the given task modify shared data accessed by both the earlier allocated tasks and the given task, the squashing nullifying results of any execution of the earlier allocated task and ensuring any elements of the dataset accessed by the earlier tasks conform to the unmodified versions per the checkpointing; and (f) allow reexecution of the squashed, earlier allocated tasks only after a determination of whether the given task has completed accessing the shared data.

16. The method of claim 15 wherein the sequential execution order is the order that the program would execute on a single processor as a single thread.

17. The method of claim 15 further including receiving an identification of each allocated task at a time of allocation in a reorder list and holding the identification in the sequential execution order before commitment and wherein (d) commits an oldest task in the reorder list.

18. The method of claim 15 wherein data dependency is detected by monitoring access to elements of the dataset by each task and detecting whether a younger task has accessed a given data element for allocation by an older task accessing the given data element to a processor, where one of the accesses is a write access.

19. A method of executing programs on a multiprocessor computer having at least two computer processors and a memory for holding a non-transient stored program comprised of separately executable tasks and a dataset operated on by the tasks;

the method comprising:

(a) identifying a sequential execution order of the tasks based on a serial execution of the program;

(b) allocating tasks to different processors out of sequential execution order for execution on the different processors;

(c) checkpointing modification by the tasks of accessed elements of the dataset, such modification generating a changed value of the accessed elements of the dataset, to preserve an unmodified version of the accessed elements unaffected by the generated changed value of the accessed elements;

(d) committing execution of the tasks according to the sequential execution order; and (e) squashing earlier allocated tasks that are before a given task is committed in the sequential execution order if the earlier allocated tasks are data dependent on the given task, in which one of the earlier allocated tasks and the given task modify data accessed by both the earlier allocated tasks and the given task, the squashing nullifying results of any execution of the earlier allocated task and ensuring any elements of the dataset accessed by the earlier tasks conform to the unmodified versions per the checkpointing; and (f) allowing reexecution of the squashed, earlier allocated tasks only upon completion of execution of the given task;

wherein data dependency is detected by monitoring access to elements of the dataset by each task and detecting whether a younger task has accessed a given data element for allocation by an older task accessing the given data element to a processor, where one of the accesses is a write access;

wherein the data elements are associated with read and write tokens that must be acquired by a task to access a data element, and wherein multiple read tokens may be granted to tasks for a given data element only if no write token has been granted, and wherein a write token may be granted to a task only if a read token has not been granted to any task, and wherein data dependency is detected when an older task cannot obtain a token necessary to access a data element.

20. The method of claim 19 further including a requester list storing tasks that request tokens and indicating a sequential execution order of the tasks and wherein the requester list is used to identify for squashing a younger task that prevents an older task from obtaining a token.

* * * * *